United States Patent
Henriksson et al.

(10) Patent No.: US 10,222,451 B2
(45) Date of Patent: Mar. 5, 2019

(54) IMPROVING ACCURACY WHEN DETERMINING POSITIONS IN A WIRELESS NETWORK

(71) Applicant: Telefonaktiebolaget LM Ericsson (publ), Stockholm (SE)

(72) Inventors: Daniel Henriksson, Linköping (SE); Tobias Ahlström, Ljungsbro (SE); Kenneth Balck, Linköping (SE); Markus Drevö, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/529,007

(22) PCT Filed: Dec. 4, 2014

(86) PCT No.: PCT/SE2014/051451
§ 371 (c)(1),
(2) Date: May 23, 2017

(87) PCT Pub. No.: WO2016/089266
PCT Pub. Date: Jun. 9, 2016

(65) Prior Publication Data
US 2017/0269190 A1    Sep. 21, 2017

(51) Int. Cl.
*H04W 24/00*    (2009.01)
*G01S 5/14*    (2006.01)
(Continued)

(52) U.S. Cl.
CPC ............... *G01S 5/14* (2013.01); *G01S 5/021* (2013.01); *G01S 5/0242* (2013.01);
(Continued)

(58) Field of Classification Search
USPC ...... 455/456.6, 456.1, 456.5, 440, 524, 403, 455/523
See application file for complete search history.

(56) References Cited

U.S. PATENT DOCUMENTS

2003/0190919 A1* 10/2003 Niemenmaa .............. G01S 5/10
455/456.1
2004/0198386 A1* 10/2004 Dupray ................. H04W 64/00
455/456.1
(Continued)

FOREIGN PATENT DOCUMENTS

| WO | 0133302 A2 | 5/2001 |
| WO | 0165271 A1 | 9/2001 |
| WO | 0223215 A1 | 3/2002 |

*Primary Examiner* — Joseph Arevalo
(74) *Attorney, Agent, or Firm* — Sage Patent Group (57) ABSTRACT

Disclosed is a method performed by a position calculation node (160) in a wireless communication network (100). The node (160) is arranged for improving accuracy when determining positions in the wireless communication network. The method comprises obtaining a signal transport time value for each of a plurality of different geographical UE positions (UE1, UE2, UE3), wherein the respective signal transport time value relates to the time it takes for a radio signal to travel between a first base station and one of the plurality of UE positions. The method further comprises obtaining a geographical position value for each of the plurality of different geographical UE positions, the position values being independent of the signal transport time values, and determining an actual geographical position for the first base station, based on the obtained signal transport time values, the obtained position values and a predefined geographical position for the first base station.

12 Claims, 7 Drawing Sheets

(51) Int. Cl.
*G01S 19/45* (2010.01)
*G01S 5/02* (2010.01)
*H04W 64/00* (2009.01)
*G01S 13/76* (2006.01)

(52) U.S. Cl.
CPC .......... *G01S 5/0252* (2013.01); *G01S 13/765* (2013.01); *G01S 19/45* (2013.01); *H04W 64/00* (2013.01); *H04W 64/003* (2013.01)

(56) References Cited

U.S. PATENT DOCUMENTS

| | | | |
|---|---|---|---|
| 2004/0266457 A1* | 12/2004 | Dupray | G01S 5/0268 455/456.5 |
| 2007/0287473 A1* | 12/2007 | Dupray | H04W 4/02 455/456.1 |
| 2009/0168674 A1 | 7/2009 | Strutt et al. | |
| 2010/0331012 A1* | 12/2010 | Zhang | H04W 64/003 455/456.2 |
| 2012/0058775 A1* | 3/2012 | Dupray | G01S 5/0257 455/456.1 |
| 2013/0285855 A1* | 10/2013 | Dupray | G01S 19/48 342/451 |

* cited by examiner

IMPROVING ACCURACY WHEN DETERMINING POSITIONS IN A WIRELESS NETWORK

TECHNICAL FIELD

The present disclosure relates generally to various methods, position calculation nodes and pieces of user equipment, UEs, arranged for improving accuracy when determining positions in a wireless communication network.

BACKGROUND

Signal transport time based positioning methods may be used when geographically positioning UEs in a wireless communication network. Examples of such signal transport time based positioning systems are Time of Arrival, TOA-based or Time Difference of Arrival, TDOA-based positioning methods. The signal transport time based positioning methods are generally based on one of the two following principles: One transmitting unit transmits a radio signal that is received by a plurality of receiving units, or a plurality of transmitting units transmit simultaneously or with a known time difference a signal that is received by one receiving unit. In the first principle, the transmitting unit may be a UE which is to be positioned and the plurality of receiving units may be base stations, e.g. eNodeBs. In the second principle, the plurality of transmitting units may be base stations and the receiving unit may be a UE that is to be positioned. Measurements are then performed to detect receiving time (aka. time point) and possibly also transmitting time. Based on the detected times, signal transport times indicating distance between receiving and sending units may be determined.

In the TOA-based method, the time when sending of a radio signal from a transmitting unit is detected and the time of arrival, TOA, when the signal arrives at the receiving unit is detected. A network node such as a positioning node receives the detected times from the respective nodes and determines a time difference that would be a measure of the time it took for the signal to travel between the transmitting node and the receiving node and therefore a measure of the signal path distance.

In the TDOA-based method, such as the Observed TDOA, OTDOA, used in Long Term Evolution, LTE-based networks, a plurality of eNodeBs transmit Positioning Reference Signals (PRS). The UE performs measurements on the signals and estimates the TOAs of the different signals. From the TOA values the UE calculates Reference Signal Time Difference, RSTD, values, which is the difference between TOA pairs. The RSTD values are then reported to the positioning node that performs the TDOA positioning based on the different TOA pairs.

When determining the position of UEs in a wireless communication network using signal transport time based positioning methods, the positions of the base station antenna(s) sending/receiving the signals used for the determination are used as reference points. If there is an error in the antenna position, i.e. if there is a difference between the real antenna position and the coordinate value specifying the antenna position, this will lead to an error in the UE position estimated based on the TOA/TDOA values and the coordinate value specifying the base station antenna position. Another parameter that may cause errors in the estimated TOA/TDOA values and consequently in the UE position determination is if there is an unknown delay in the signal path. If for example the transmitter thinks it transmits the signal at time 0 ns, but the signal instead actually leaves the antenna X ns later. The TOA estimation will also in this case contain an error due to the unknown delay in the signal path.

Figure 1A:
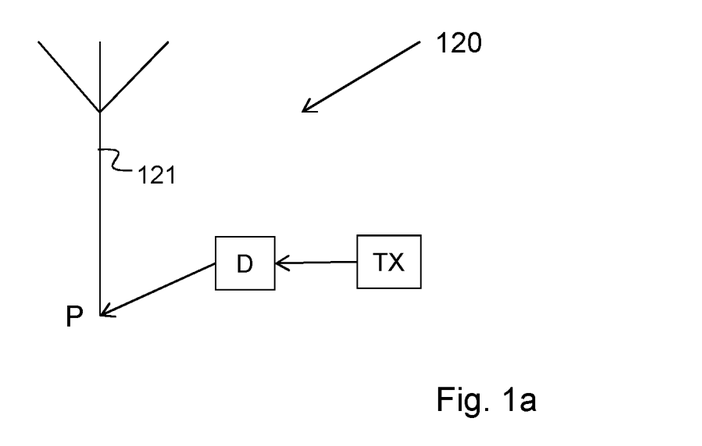
FIGS. 1a and 1b are schematic block diagrams illustrating a base station comprising antenna and transmitter.
Figure 1B:
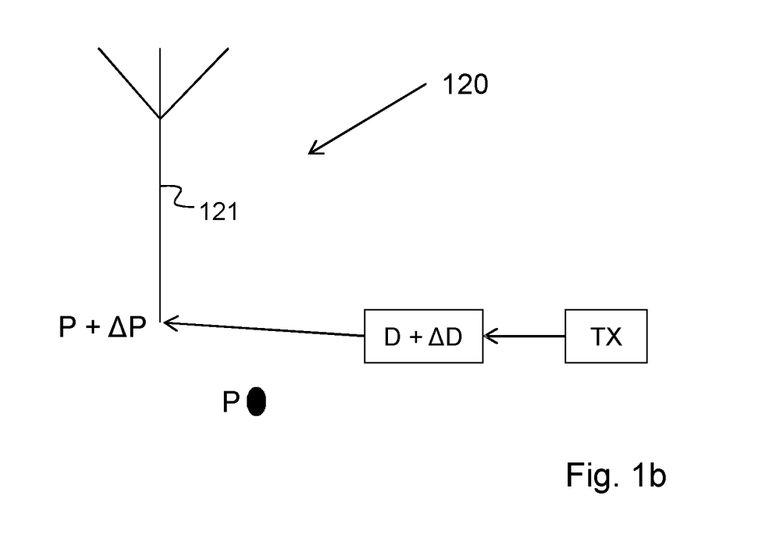

FIGS. 1a and 1b show a system where these two errors/mismatches between reality and the system view, i.e. internal coordinates and settings, are illustrated. FIG. 1a illustrates the system view of a base station node 120. The system expects an antenna 121 of the base station 120 to be at position P and that the delay between a transmitter TX of the base station 120 and the antenna 121 is D. FIG. 1b shows how the system is in reality. The antenna 121 is not in position P but in position P+ΔP and the delay is not exactly D but D+ΔD.

If the ΔP and possible also ΔD could be estimated the system/nodes could be updated with these parameters and thereby reduce the error on the estimated positions for the UEs, estimated based on TOA/TDOA values and base station antenna coordinates.

SUMMARY

It is an object of the invention to address at least some of the problems and issues outlined above. It is another object to achieve better UE position estimations when using signal transport time based positioning methods. It is another object to achieve an estimation of an error in a predefined base station position and, if there is one, an error in a predefined base station delay between a transmitter unit/receiver unit and the base station antenna. It is possible to achieve at least some of these objects and possibly also others by using a method and an apparatus as defined in the attached independent claims.

According to one aspect, a method is provided performed by a position calculation node in a wireless communication network for improving accuracy when determining positions in the wireless communication network. The method comprises obtaining a signal transport time value for each of a plurality of different geographical UE positions, wherein the respective signal transport time value relates to the time it takes for a radio signal to travel between a first base station and one of the plurality of UE positions. The method further comprises obtaining a geographical position value for each of the plurality of different geographical UE positions, the position values being independent of the signal transport time values, and determining an actual geographical position for the first base station, based on the obtained signal transport time values, the obtained position values and a predefined geographical position for the first base station According to another aspect, a method is provided performed by a UE in a wireless communication network for improving accuracy when determining positions in the wireless communication network. The method comprises measuring a signal transport time value at a first UE position on a radio signal associated with a first base station and determining a geographical position value for the first UE position, the position value being independent of the measured signal transport time value. The method further comprises sending the measured signal transport time value to a position calculation node and sending the determined geographical position value to the position calculation node. The sent geographical position value and the time of arrival value are used at the position calculation node for first base station position determinations.

According to another aspect, a position calculation node is provided in a wireless communication network, configured for improving accuracy when determining positions in the wireless communication network. The position calculation node comprises a processor and a memory. The memory contains instructions executable by said processor, whereby the position calculation node is operative for obtaining a signal transport time value for each of a plurality of different geographical UE positions, wherein the respective signal transport time value relates to the time it takes for a radio signal to travel between a first base station and one of the plurality of UE positions. The position calculation node is further operative for obtaining a geographical position value for each of the plurality of different geographical UE positions, the position values being independent of the signal transport time values, and determining an actual geographical position for the first base station, based on the obtained signal transport time values, the obtained position values and a predefined geographical position for the first base station.

According to another aspect, a UE is provided in a wireless communication network, configured for improving accuracy when determining positions in the wireless communication network. The UE comprises a processor and a memory. The memory contains instructions executable by said processor, whereby the UE is operative for measuring a signal transport time value at a first UE position on a radio signal associated with a first base station, and determining a geographical position value for the first UE position, the position value being independent of the measured signal transport time value. The UE is further operative for sending the measured signal transport time value to a position calculation node, and for sending the determined geographical position value to the position calculation node. The sent geographical position value and the time of arrival value are to be used at the position calculation node for first base station position determinations.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to improve UE positioning determination in a wireless communication network using signal transport time based positioning methods such as TOA and TDOA. The solution is based on estimating an error in a predefined geographical position of an antenna of a base station by obtaining signal transport time values associated with the base station at a plurality of different UE positions and at the same plurality of UE positions obtain a geographical UE position values by a different positioning method, such as Global Positioning system, GPS. The obtained signal transport time values are then compared to estimated signal transport time values estimated from the obtained geographical UE position values and the predefined base station antenna positions. The discrepancy between these two different calculations is a measure of the error of the predefined geographical position of the base station antenna which could be used to achieve a better estimation of the base station antenna position.

The method could be added with a predefined base station delay to also estimate an error in the predefined base station delay. The base station delay error could be achieved from the same method above by adding one or more UE positions for which UE position values and signal transport time values are obtained.

Figure 2:
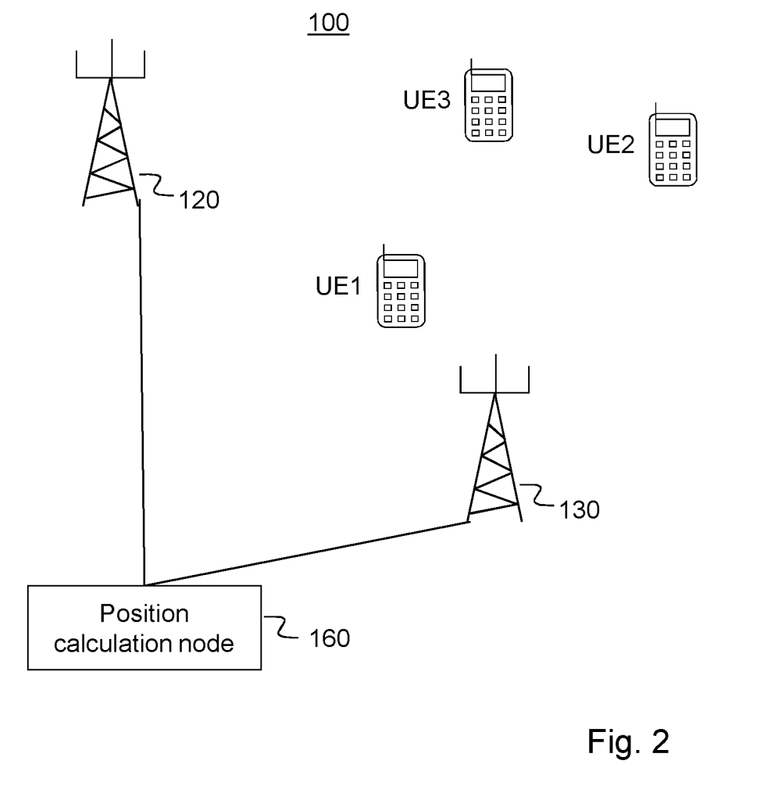
FIG. 2 is a schematic block diagram of a wireless communication network in which the present invention can be used.

FIG. 2 shows a wireless communication network 100 in which the present invention may be used. The network 100 may be built on any wireless communication technology, such as Global System for Mobile communication, GSM, IS-95 Code Division Multiple Access, CDMA, third generation systems such as Universal Mobile Telecommunication system, UMTS, and CDMA2000, and 3rd Generation Partnership Project Long Term Evolution, 3GPP LTE. The network 100 comprises a first base station 120 and a second base station 130. The base stations are arranged to transmit and receive radio signals to UEs, UE1, UE2, UE3, located at different positions in a geographical area covered by the base stations 120, 130. The base stations 120, 130 are also connected to a position calculation node 160, which may be any network node in the wireless communication network, such as a regular positioning node, e.g. an enhanced Serving Mobile Location Center, e-SMLC in LTE, or any other core network node or even a radio network node, such as employed in any of the first or the second base station. The UEs may be any equipment that has a wireless transmitter and receiver for communicating wirelessly via the base stations, such as a mobile station e.g. a mobile phone, a laptop, a machine equipped transmitter and receiver, e.g. a vending machine.

Figure 3:
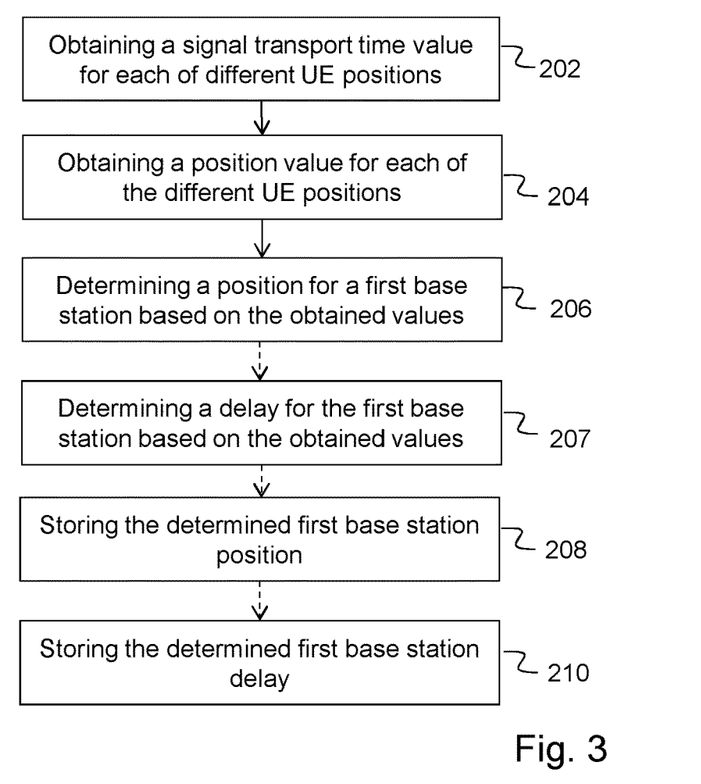
FIG. 3 is a flow chart illustrating a method performed by a position calculation node, according to possible embodiments.

FIG. 3 illustrates a method according to an embodiment, performed by a position calculation node 160 in a wireless communication network 100 for improving accuracy when determining positions in the wireless communication network. The method comprises obtaining 202 a signal transport time value for each of a plurality of different geographical UE positions UE1, UE2, UE3, wherein the respective signal transport time value relates to the time it takes for a radio signal to travel between a first base station and one of the plurality of UE positions. The method further comprises obtaining 204 a geographical position value for each of the plurality of different geographical UE positions, the position values being independent of the signal transport time values; and determining 206 an actual geographical position for the first base station, based on the obtained signal transport time values, the obtained position values and a predefined geographical position for the first base station.

"A signal transport time value" is a value related to the time it takes for a signal to be transported from a sending unit to a receiving unit, i.e. either from a base station to a UE at a UE position, or from the UE at the UE position to the base station. The base station may e.g. be the first base station and the UE position may e.g. be the first UE position. The signal transport time value may also be a value of the signal path; signal time and signal path are two different ways of explaining the same phenomenon. The signal transport time value may comprise a TOA value and a time of sending, TOS, value. The TOA value may be received from a UE at a first UE position and the TOS may be received from the first base station, when the first base station sends the signal, and vice versa when the UE at the first UE position sends the signal. Alternatively, the signal transport time value may be a TDOA value, which is obtained from TOA values measured at the first UE positions on signals from two different base stations. In the latter case, the TOS value can be omitted. The TOS value may, for the example when PRSs are used for measuring, be known in the system since it is predefined in the network on which subframes the PRS are to be sent.

The more UE positions that are used, the more exact the result of the calculation of actual geographical position for the first base station, at least up to a certain number of UE positions. For example, for determining a rather exact actual geographical position for the first base station, signal transport time values and position values for three different UE positions may be needed. When only using two different UE positions, ambiguities may occur, i.e. there may be two solutions possible. However, then the solutions closest to the predefined base station position may be selected. Preferably, the two, three or more different UE positions should be spread out in the system so that the signal(s) sent from/to the first base station to/from the different UE positions have a rather large difference in directions.

The obtaining 202 of a signal transport time value for each of a plurality of different geographical UE, wherein the respective signal transport time value relates to the time it takes for a radio signal to travel between a first base station and one of the plurality of UE positions may signify to obtain a first signal transport time value for a first UE position UE1, which first signal transport time value relates to the time it takes for a radio signal to travel between the first base station and the first UE position, and to obtain a second signal transport time value for a second UE position UE2, which second signal transport time value relates to the time it takes for a signal to travel between the first base station and the second UE position, and so on for the rest of the plurality of UE positions. Further, the obtaining 204 of a geographical position value for each of the plurality of different geographical UE positions, the position values being independent of the signal transport time values, may signify to obtain a position value at the first UE position UE1, the obtained first UE position value being independent of the first signal transport time value, and to obtain a position value at the second UE position UE2, the obtained second UE position value being independent of the second signal transport time value, and so on for the rest of the plurality of UE positions. It may be the same UE that is travelling between the different UE positions or different UEs may be used at the different UE positions.

According to an embodiment, the predefined and actual geographical positions for the first base station (and second base station, if there is one) defines the position for the antenna of the base station (in case TOA is measured at the base station it is the base station receiving antenna position, in case the TOA is measured at the UE it is the base station sending antenna position).

As shown, the method makes it possible to better estimate the geographical position of the first base station based on using two different ways to calculate individual of a plurality of UE positions. Such an improved calculation of the BS position could then be used thereafter to more exactly calculate other UE positions in the system, also for UEs not having GPS (or similar positioning system) installed. In this proposed method it is approximated that a difference in obtained position value and a position value calculated from the signal transport time values for one and the same UE position only depends, or at least predominantly depends, on a deviation between expected BS position and actual BS position. The method may be said to use a function for determining where UEs are situated based on TOA/TDOA measurements at a plurality of UE positions together with UE position values determined using e.g. GPS for the same UE positions, to backwards determining more accurate positions for one or more base stations, which base station positions were presumed to be correct in the UE position determination function. A further advantage of the present method may be to contribute to a simpler installation process of new base stations since it offers an automatic way to estimate antenna positions starting from an approximate antenna position.

According to an embodiment, each of the signal transport time values comprises a TOA value indicating when a radio signal arrived at a receiving node and a time of sending value indicating when the radio signal was sent from a transmitting node, the receiving node being the first base station 12) and the transmitting node being a UE at one of the plurality of UE positions, or the receiving node being the UE at one of the plurality of UE positions and the transmitting node being the first base station.

According to another embodiment, each of the signal transport time values comprises a reference signal time difference, RSTD, value calculated as a difference between a first TOA value associated with the first base station 120, and a second TOA value associated with a second base station 130. The determining 206 comprises determining the actual geographical position for the first base station and an actual geographical position for the second base station based on the obtained signal transport time values, the obtained position values, the predefined geographical position for the first base station and a predefined geographical position for the second base station. The signal or signals on which the first and second TOA values are calculated, are sent simultaneously, or alternatively with a known delay between them. In case there is one signal sent from a UE in one of the UE positions towards the first and the second base station, it is of course one and the same signal. In case one signal is sent from the first base station towards the UE in one of the UE positions, another signal is sent simultaneously from the second base station towards the first UE position. Even though the method may function satisfactory using three different UE positions, even better results would be achieved if data for more than three UE positions would be used. For example, when using five different UE positions for determining actual positions for two base stations using TDOA, a rather exact base station position measurement is achieved, as shown in the attached example, see FIG. 6.

Figure 4:
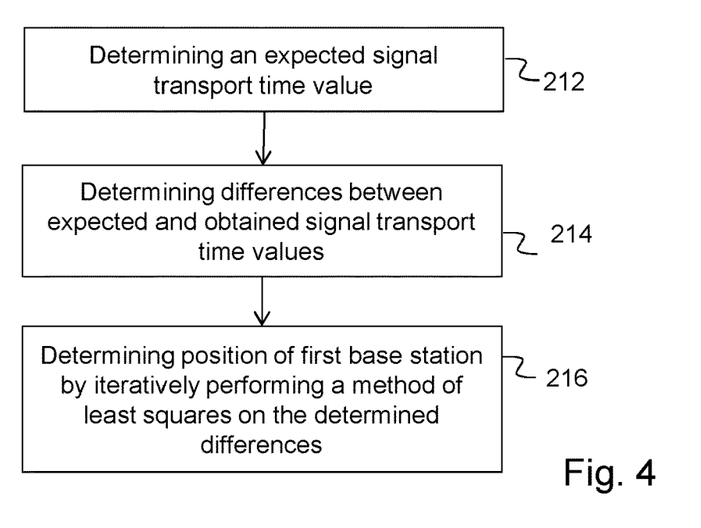
FIG. 4 is another flow chart illustrating a method performed by a position calculation node, according to possible embodiments.

According to another embodiment, the determining 206 of an actual geographical position for the first base station comprises determining 212 an expected signal transport time value for each of the UE positions based on the respective obtained UE position values and the predefined geographical position for the first base station and determining 214 differences between respective of the expected signal transport time values and respective of the obtained signal transport time values that concerns the same UE position. The determining 206 further comprises determining 216 the actual geographical position for the first base station by iteratively performing a method of least squares on the determined differences, while adjusting the predefined geographical position of the first base station between each iteration until the determined differences approaches zero, or at least a minimal value. When the determined differences between respective of the expected signal transport time values and respective of the obtained signal transport time values that concerns the same UE position approach zero, the predefined geographical position has been iterated towards the actual geographical position of the base station, or at least to a good approximation of the actual geographical position of the base station.

According to an alternative of the above embodiment, the method of least squares uses the following formula:

$$BS_{x,y} = \underset{x,y}{\operatorname{argmin}} \sum_{all\ measurements} (\text{measured } TOA - \text{expected } TOA(BS_{x,y}))^2$$

wherein x,y are geographical co-ordinates, TOA is signal transport time value exemplified by Time of Arrival, TOA and $BS_{x,y}$ being an approximation of the geographical position of the base station.

According to another embodiment, the method further comprises storing 208 the determined actual geographical position for the first base station as a new predefined geographical position for the first base station, and, if there is a second base station, storing the determined actual geographical position for the second base station as a new predefined geographical position for the second base station. Such updated geographical positions for the first base station and possibly also for the second base station may then be used subsequently for calculating UE positions using TOA/DTOA, e.g. for UEs for which there is no known geographical position value, such as a GPS-position.

According to another embodiment, the method further comprises: determining 207 an actual first base station delay, based on the obtained signal transport time values, the obtained position values, the predefined geographical position for the first base station and a predefined first base station delay. The base station signal delay is a delay from when the base station transmitter sends the signal until the signal leaves the base station antenna. When using time of arrival to determine UE position, there may be a difference between predefined base station signal delay and actual base station signal delay, as well as there may be a difference between actual base station (antenna) position and predefined base station position. In calculating actual UE position using time of arrival also this delay difference may be taken into account, to achieve an even better approximation of the UE position. Therefore, when determining actual base station positions backwards as in claim 1 also the actual base station signal delay may be determined. For being able to determine also the delay difference, values for one more UE position may be needed compared to the method of claim 1, to solve an equation system. A similar formula to the least square-formula mentioned earlier may be used, but expanded with a delay term in the expected TOA model/expression. Further, it may be possible to cater for individual delay differences at the first and second base stations, for the TDOA version, by setting up two unknown variables, one for delay at the first base station and another for delay at the second base station. Of course values for more UE positions are needed, probably two more positions.

According to an embodiment, the method further comprises storing 210 the determined actual first base station delay as a new predefined first base station delay.

According to an embodiment, one or more of the position values for the respective UE position may be obtained from a measurement of the respective position using a known positioning system such as Global Positioning System, GPS. Alternatively, one or more of the position values for the respective UE position may be known by the positioning node in advance, e.g. by using a UE situated in an already known position such as in a lab or similar.

Figure 5:
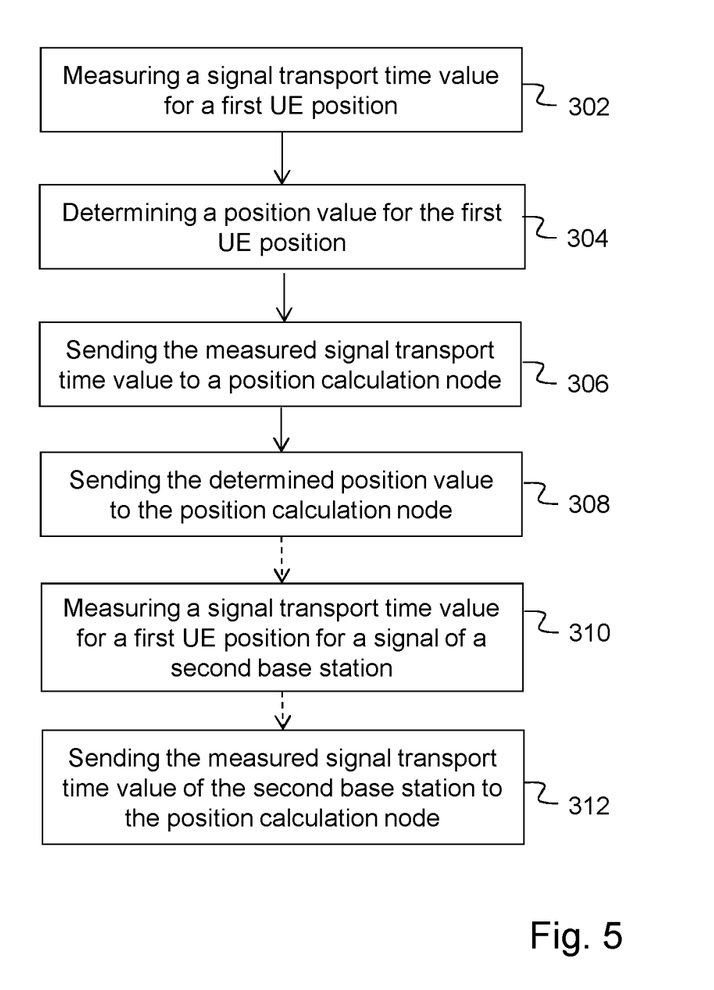
FIG. 5 is a flow chart illustrating a method performed by a UE, according to possible embodiments.

FIG. 5 illustrates an embodiment of a method performed by a UE in a wireless communication network for improving accuracy when determining positions in the wireless communication network. The method comprises measuring 302 a signal transport time value at a first UE position on a radio signal associated with a first base station and determining 304 a geographical position value for the first UE position, the position value being independent of the measured signal transport time value. The method further comprises sending 306 the measured signal transport time value to a position calculation node and sending 308 the determined geographical position value to the position calculation node. The sent geographical position value and the time of arrival value are to be used at the position calculation node for first base station position determinations. The measuring 302 and subsequent sending 306 of the signal transport time value may be performed independently of when the determination 304 and subsequent sending 308 of the position value is performed. By sending the received time of arrival values for the first UE position and the determined positioning value for the first UE position to the position determination node, the position determination node can use these values together with a positioning value for a second UE position, received time of arrival values for the second UE position and a predefined geographical position for the first base station to calculate an actual geographical position for the first base station.

According to an embodiment, the method further comprises measuring 310 a signal transport time value at a first UE position on a radio signal associated with a second base station and sending 312 the measured signal transport time value associated with the second base station to a position calculation node. By measuring and sending also signal transport time value for a signal associated with a second base station, for example TDOA calculations may be performed. The UE may be perform the TDOA calculations itself and send the signal transport time values as an RSRP values to the position calculation node.

According to an embodiment of the invention, a UE may perform measurements of TOA and simultaneously, or at least in the same geographical position, measure its position with some other accurate method, for example GPS. An alternative is to perform the TOA measurements from known positions. By doing this at a plurality of UE positions it is possible to create measurement pairs with observed TOA value along with the known, or by another method measured, position value. These pairs can then be used for estimating errors in base station antenna position and possibly also errors in estimated signal path delay in the base station transmitter. For a single measurement pair the antenna position error and delay error cannot be separated and estimated independently, since the errors are summed, but if the measurements are taken from different UE positions the different error types can be separated. The reason for this is that the antenna position error will contribute differently to the overall error depending on the UE position whereas the delay error is independent of the UE position.

According to another embodiment, the first step of the procedure is to collect measurements. The measurements are performed by one or more UE/UEs from different geographical positions. When using TDOA measurements, the UE needs to perform measurements on radio signals from at least two different base station antennas. The UE/UEs also need to know its/their position at the different geographical positions. The UE position can be known a priori or be measured by the UE using another positioning method, for example GPS.

Referring back to FIG. 3, one UE in e.g. position UE1 receives a PRS from each of the first base station and the second base station and measures TOA on each signal. The base stations are in this case eNodeBs since in this example an LTE system is presumed. In the same position the UE obtains a geographical position value. A single collection of values will then comprise the TOA measurement values for signals from two eNodeBs and the UE position value. The UE will then report the collection of values to a network node responsible for doing the calibration/calculations, such as the position calculation node 160. In the current version of the LTE Positioning Protocol, LPP, the UE can only report the RSTD, i.e. TDOA, values for one transmitting antenna pair, i.e. one pair of eNodeBs. In the described method it is possible to use TOA values or TDOA values, so looking from a method perspective any of the two measurement types can be sent to the positioning node. The collection of values is sent from the UE via the eNB to the positioning node.

The positioning node 160 collects measurement pairs, i.e. TOA measurement values for signals from two eNodeBs and the UE position value, for a plurality of UE positions until the amount of measurements is considered to be sufficient. The positioning node can then initiate an estimation of the antenna position error and the signal delay error for two or more eNodeB antennas.

The estimation is based on comparing the measured values, e.g. TOA or TDOA, with expected TOA/TDOA values calculated using the UE position values and predefined, i.e. estimated, geographical eNodeB antenna positions. The expected values are calculated using a model describing how antenna positions and signal delay will impact the measurements. The model parameters are adjusted until a match between measured and expected values is accomplished. This can for example be done by the use of a standard least square optimization method.

A possible standard least square optimization method is the following:

$$BS_{x,y} = \underset{x,y}{\mathrm{argmin}} \sum_{all\ measurements} (\text{measured } TOA - \text{expected } TOA(BS_{x,y}))^2$$

A plurality of measured TOA values and expected TOA values from different UE positions are needed. By a least square optimization method as the one above and with a plurality of such method and expected TOA values it is possible to "move" the expected eNodeB antenna position so that the expected TOA is changed. When the expected TOA is as close to the measured TOA as possible for all measurement pairs, a better expected eNodeB antenna position has been found. The least square optimization method may be said to be performed when the difference between expected and measured TOA is below a threshold. In other words, the method looks for x,y coordinates for the eNodeB antenna position that results in the lowest square sum for the differences between measured and expected TOA for the plurality of UE positions. Also, expected TOA values may be a function of the eNodeB antenna position BSxy. A predefined system position for the eNodeB antenna position may be used as a start value.

Using the parameters defined in the background chapter in connection with FIG. 1 the measured TDOA and expected TDOA can be expressed as, $$TDOA_{meas} = f(P_1+\Delta P_1, D_1+\Delta D_1, P_2+\Delta P_2, D_2+\Delta D_2, UE_{pos})$$

$$TDOA_{expected} = f(P_1, D_1, P_2, D_2, UE_{pos})$$

and for TOA measurements it can be expressed as:

$$TDOA_{meas} = g(P_1+\Delta P_1, D_1+\Delta D_1, P_2+\Delta P_2, D_2+\Delta D_2, UE_{pos})$$

$$TDOA_{expected} = g(P_1, D_1, P_2, D_2, UE_{pos})$$

Note that the model function is denoted by f and g above, and that there are a lot of different models that can be used. Also note that measured TOA and TDOA is not calculated from the model. For both these the actual measurement is used, but the functions f and g should try to be as realistic as possible.

The below least square method formula is an example of a formula that may be used to calculate base station position and delay using TOA:

$$BS_{x,y,d} = \underset{x,y,d}{\mathrm{argmin}} \sum_{all\ measurements} (\text{measured } TOA - \text{expected } TOA(BS_{x,y,d}))^2$$

The below least square method formula is an example of a formula that may be used to calculate base station position for two base stations using TDOA:

$$BS1_{x,y}\ \&\ BS2_{x,y} = \underset{BS1_{x,y}\ \&\ BS2_{x,y}}{\mathrm{argmin}} \sum_{all\ measurements} (\text{measured } TDOA - \text{expected } TDOA(BS1_{x,y}\ \&\ BS2_{x,y}))^2$$

The below least square method formula is an example of a formula that may be used to calculate base station position for two base stations, and a delay difference between the two bse stations using TDOA:

$$BS1_{x,y}\&BS2_{x,y}\&\Delta d = \underset{BS1_{x,y}\&BS2_{x,y}\&\Delta d}{\mathrm{argmin}} \sum_{all\ measurements}(\text{measured TDOA}-\text{expected TDOA}(BS1_{x,y},BS2x,y,\Delta d))^2$$

Observe that in TDOA two base station positions are calculated simultaneously, in pairs, since the signal is used pair-wise.

When the eNodeB antenna position and signal delay have been estimated, the eNodeB antenna coordinates and signal delays can be updated for each antenna (TOA) and antenna pair (TDOA). These updated values can then be used during UE positioning procedures in the future.

Figure 6:
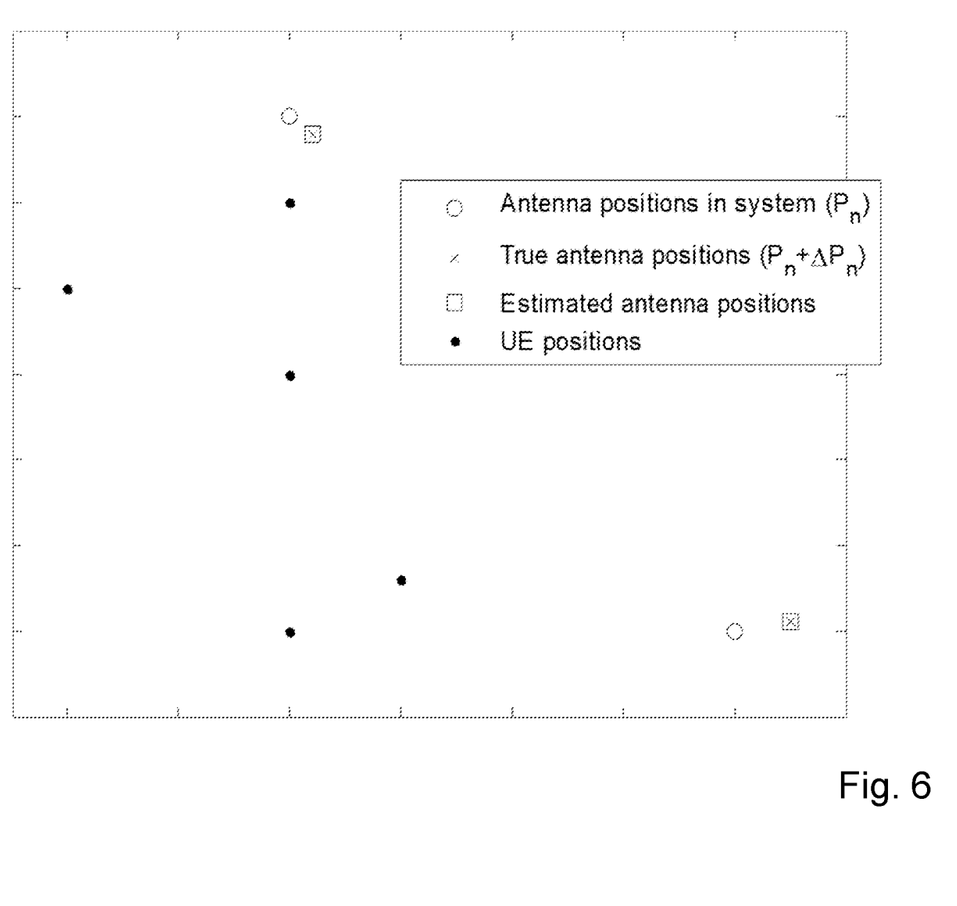
FIG. 6 is a diagram illustrating simulation results using the described invention.

FIG. 6 illustrates an example of the estimation process for TDOA values. The purpose is to make a proof of concept. The example has been executed in Matlab with a short script. In this example five different UE positions have been used. The positions have been chosen randomly. In each position a simulated measurement of RSTD has been performed along with a measurement of the UE position. The base of the measurement is the actual antenna positions and actual signal path delays, including the unknown signal delay previously mentioned. The result is then 5 RSTD measurements and 5 measurement positions. These measurements have then been used for estimating the true antenna position using a simple measurement model and a standard optimization method. The measurement model is used for calculating the expected RSTD from antenna positions.

Both RSTD measurement and own UE position has been measured without any measurement errors in this example, since the purpose was to show that the measurements contains the information needed to estimate both actual base station antenna positions and unknown signal path delay. As shown in the figure the estimated base station antenna positions correspond perfect with the true antenna positions. Also the difference in unknown signal path is estimated accurately, even though this is not shown in the figure. In FIG. 6, the circles denotes the positions where the base station antennas are supposed to be, while the base station antennas in reality are at the x:s. The estimation process results in the estimated base station antenna positions marked by the squares, which in this case corresponds to the true antenna positions.

As mentioned previously, the UE needs to be able to report both its position and its measurement, TOA or TDOA, for the invention to work. The communication between the positioning node and UE may be done via an LPP interface. To support this invention, the LPP interface could be expanded to include a new procedure for OTDOA calibration measurements. If LPP is to be used, one of existing LPP Information Elements, IE, has to be expanded or a completely new IE has to be introduced. Such a new information element needs to support simultaneous reporting of TOA and/or TDOA measurement along with UE position, measured or known.

The results from the estimation, i.e. base station antenna positions and possibly also delay correction, can be stored centrally in the positioning node or at the concerned eNodeB. When performing the next OTDOA positioning, the positioning node can use the corrected antenna positions and the delay corrections. One way to communicate between a concerned eNodeB and the positioning node is to use an LTE Positioning Protocol Annex, LPPa, interface. If the corrections/estimations should be feed to the eNB there will be impact on the LPPa protocol in almost the same way as for the LPP protocol, i.e. a new procedure and a new or modified IE.

According to an embodiment, the UE measurements can be periodically triggered for one or more selected UEs. Alternatively, the measurements can be initiated by the UE (or the user of the UE), which could be beneficial if this procedure is to be performed during drive-test or installation of new nodes. Alternatively, the UE measurements can be triggered by a network node such as the position calculation node.

Figure 7:
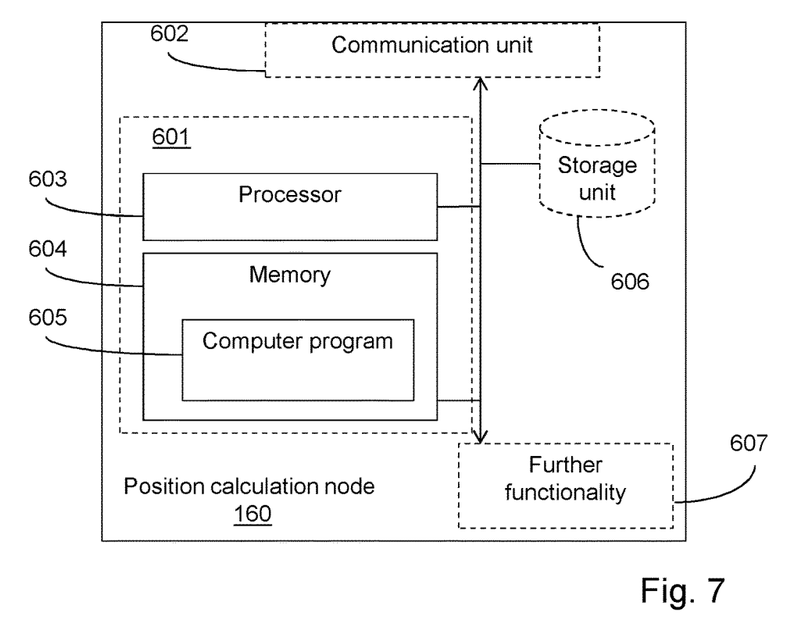
FIGS. 7-8 are block diagrams illustrating a position calculation node in more detail, according to possible embodiments.

FIG. 7 shows an embodiment of a position calculation node 160 in a wireless communication network, the position calculation node being configured for improving accuracy when determining positions in the wireless communication network. The position calculation node comprises a processor 603 and a memory 604. The memory contains instructions executable by said processor, whereby the position calculation node is operative for obtaining a signal transport time value for each of a plurality of different geographical UE positions, UE1, UE2, UE3, wherein the respective signal transport time value relates to the time it takes for a radio signal to travel between a first base station and one of the plurality of UE positions and obtaining a geographical position value for each of the plurality of different geographical UE positions, the position values being independent of the signal transport time values. The position calculation node is further operative for determining an actual geographical position for the first base station, based on the obtained signal transport time values, the obtained position values and a predefined geographical position for the first base station.

According to an embodiment, each of the signal transport time values comprises a TOA value indicating when a radio signal arrived at a receiving node and a time of sending value indicating when the radio signal was sent from a transmitting node, the receiving node being the first base station 120 and the transmitting node being a UE at one of the plurality of UE positions, or the receiving node being the UE at one of the plurality of UE positions and the transmitting node being the first base station.

According to another embodiment, each of the signal transport time values comprises an RSTD value calculated as a difference between a first TOA value associated with the first base station 120, and a second TOA value associated with a second base station 130. Further, the position calculation node 160 is operative for determining the actual geographical position for the first base station and an actual geographical position for the second base station based on the obtained signal transport time values, the obtained position values, the predefined geographical position for the first base station and a predefined geographical position for the second base station.

According to another embodiment, the position calculation node 160 is operative for determining an actual geographical position for the first base station by determining an expected signal transport time value for each of the UE positions based on the respective obtained UE position values and the predefined geographical position for the first base station, determining differences between respective of the expected signal transport time values and respective of the obtained signal transport time values that concerns the same UE position, and determining the actual geographical position for the first base station by iteratively performing a method of least squares on the determined differences, while adjusting the predefined geographical position of the first base station between each iteration until the determined differences approaches zero.

According to another embodiment, the method of least squares uses the following formula:

$$BS_{x,y} = \underset{x,y}{\operatorname{argmin}} \sum_{all\ measurements} (\text{measured } TOA - \text{expected } TOA(BS_{x,y}))^2$$

wherein x,y are geographical co-ordinates, TOA is signal transport time value exemplified by Time of Arrival, TOA and $BS_{x,y}$ being an approximation of the geographical position of the base station.

According to another embodiment, the position calculation node 160 is further operative for determining an actual first base station delay, based on the obtained signal transport time values, the obtained position values, the predefined geographical position for the first base station and a predefined first base station delay.

The position calculation node may further comprise a communication unit 602, which may be considered to comprise conventional means for communicating from and/or to the other nodes in the network, such as the first and second base station. The conventional communication means may include at least one transmitter and at least one receiver. The position calculation node may further comprise one or more storage units 606 and further functionality 607 useful for the position calculation node to serve its purpose as position calculation node. The instructions executable by said processor may be arranged as a computer program 605 stored in said memory 604. The processor 603 and the memory 604 may be arranged in an arrangement 601. The arrangement 601 may be a micro processor and adequate software and storage therefore, a Programmable Logic Device, PLD, or other electronic component(s)/processing circuit(s) configured to perform the actions, or methods mentioned above.

The computer program 605 may comprise computer readable code means, which when run in the position calculation node 160 causes the position calculation node to perform the steps described in any of the described embodiments. The computer program may be carried by a computer program product connectable to the processor. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the position calculation node has access via its communication unit 602. The computer program may then be downloaded from the server into the memory 604.

Figure 8:
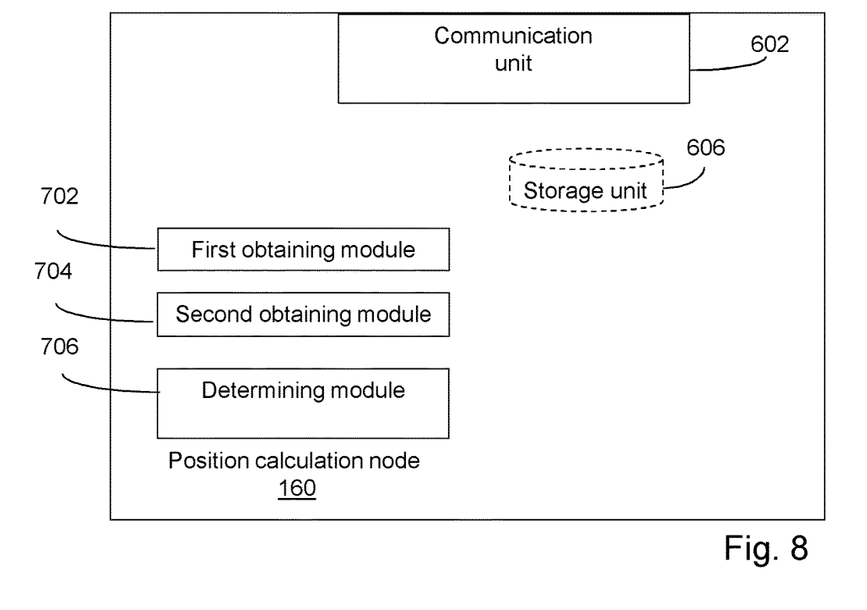

FIG. 8 shows another embodiment of a position calculation node 160 in a wireless communication network 100, configured for improving accuracy when determining positions in the wireless communication network. The position calculation node comprising a first obtaining module 702 for obtaining a signal transport time value for each of a plurality of different geographical UE positions UE1, UE2, UE3, wherein the respective signal transport time value relates to the time it takes for a radio signal to travel between a first base station and one of the plurality of UE positions. The position calculation node further comprises a second obtaining module 704 for obtaining a geographical position value for each of the plurality of different geographical UE positions, the position values being independent of the signal transport time values; and a determining module 706 for determining an actual geographical position for the first base station, based on the obtained signal transport time values, the obtained position values and a predefined geographical position for the first base station.

Figure 9:
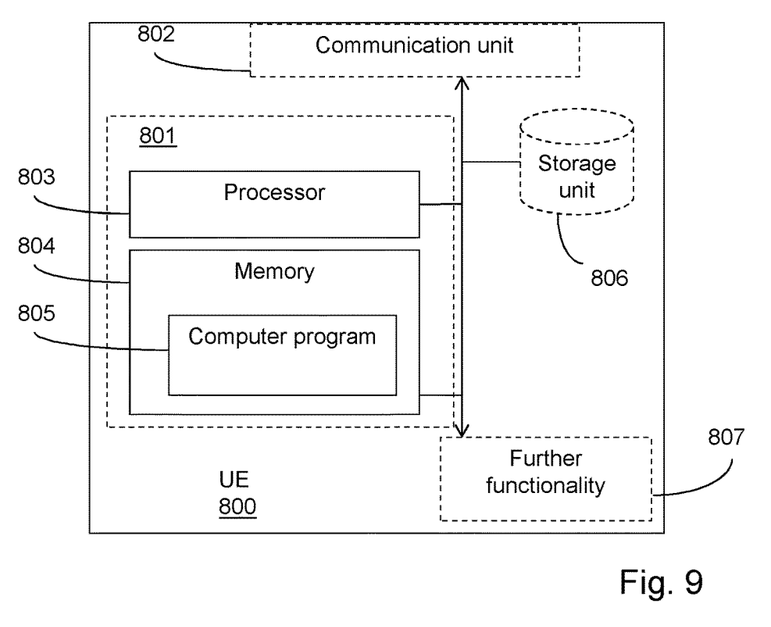
FIGS. 9-10 are block diagrams illustrating a UE in more detail, according to possible embodiments.

FIG. 9 shows an embodiment of a UE 800 in a wireless communication network, configured for improving accuracy when determining positions in the wireless communication network. The UE comprises a processor 803 and a memory 804. The memory contains instructions executable by said processor, whereby the UE 800 is operative for measuring a signal transport time value at a first UE position on a radio signal associated with a first base station, determining a geographical position value for the first UE position, the position value being independent of the measured signal transport time value, sending the measured signal transport time value to a position calculation node, and sending the determined geographical position value to the position calculation node. The sent geographical position value and time of arrival value are used at the position calculation node for first base station position determinations.

According to an embodiment, the UE is further operative for measuring a signal transport time value at a first UE position on a radio signal associated with a second base station, and sending the measured signal transport time value associated with the second base station to a position calculation node.

The UE may further comprise a communication unit 802, which may be considered to comprise conventional means for communicating from and/or to the other nodes in the network, such as the first and second base station. The conventional communication means may include at least one transmitter and at least one receiver. The UE may further comprise one or more storage units 806 and further functionality 807 useful for the UE to serve its purpose as UE, such as a battery. The instructions executable by said processor may be arranged as a computer program 805 stored in said memory 804. The processor 803 and the memory 804 may be arranged in an arrangement 801. The arrangement 801 may be a micro processor and adequate software and storage therefore, a Programmable Logic Device, PLD, or other electronic component(s)/processing circuit(s) configured to perform the actions, or methods mentioned above.

The computer program 805 may comprise computer readable code means, which when run in the UE 800 causes the UE to perform the steps described in any of the described embodiments. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the UE 800 has access via its communication unit 802. The computer program may then be downloaded from the server into the memory 804.

Figure 10:
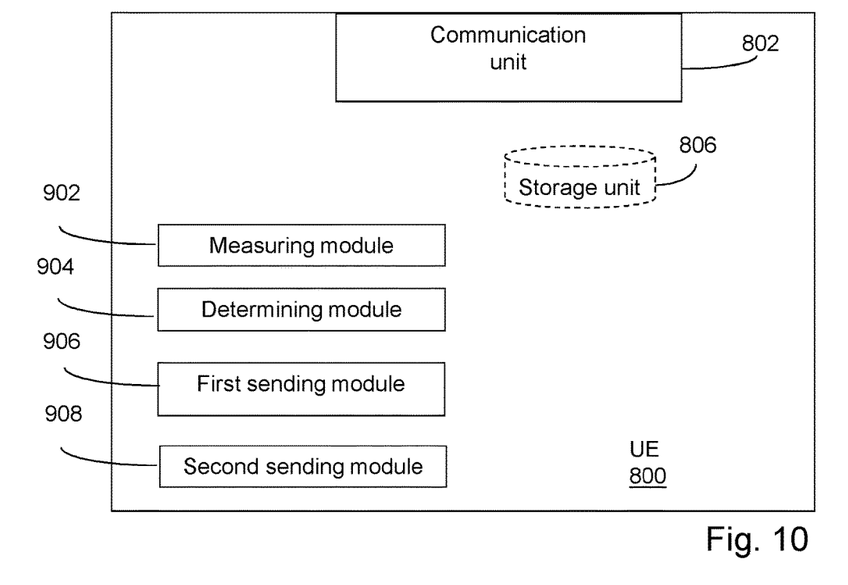

FIG. 10 shows another embodiment of a UE 800 in a wireless communication network. The UE is configured for improving accuracy when determining positions in the wireless communication network. The UE comprises a measuring module 902 for measuring a signal transport time value at a first UE position on a radio signal associated with a first base station and a determining module 904 for determining a geographical position value for the first UE position, the position value being independent of the measured signal transport time value. The UE further comprises a first sending module 906 for sending the measured signal transport time value to a position calculation node, and a second sending module 908 for sending the determined geographical position value to the position calculation node. The sent geographical position value and time of arrival value are used at the position calculation node for first base station position determinations.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a position calculation node in a wireless communication network for improving accuracy when determining positions in the wireless communication network, the method comprising:
   obtaining a signal transport time value for each of a plurality of different geographical user equipment (UE) positions, wherein the respective signal transport time value relates to the time it takes for a radio signal to travel between a first base station and one of the plurality of UE positions;
   obtaining a geographical position value for each of the plurality of different geographical UE positions, the position values being independent of the signal transport time values;
   determining an actual geographical position for the first base station, based on the obtained signal transport time values, the obtained position values and a predefined geographical position for the first base station; and
   storing the determined actual geographical position for the first base station as a new predefined geographical position for the first base station, and, if there is a second base station, storing the determined actual geographical position for the second base station as a new predefined geographical position for the second base station.

2. The method of claim 1, wherein each of the signal transport time values comprises a time of arrival (TOA) value indicating when a radio signal arrived at a receiving node and a time of sending value indicating when the radio signal was sent from a transmitting node, the receiving node being the first base station and the transmitting node being a UE at one of the plurality of UE positions, or the receiving node being the UE at one of the plurality of UE positions and the transmitting node being the first base station.

3. The method of claim 1, wherein each of the signal transport time values comprises a reference signal time difference (RSTD) value calculated as a difference between a first time of arrival (TOA) value associated with the first base station, and a second TOA value associated with a second base station, and wherein the determining comprises determining the actual geographical position for the first base station and an actual geographical position for the second base station based on the obtained signal transport time values, the obtained position values, the predefined geographical position for the first base station and a predefined geographical position for the second base station.

4. The method of claim 1, wherein the determining of an actual geographical position for the first base station comprises:
   determining an expected signal transport time value for each of the UE positions based on the respective obtained UE position values and the predefined geographical position for the first base station,
   determining differences between respective of the expected signal transport time values and respective of the obtained signal transport time values that concerns the same UE position
   determining the actual geographical position for the first base station by iteratively performing a method of least squares on the determined differences, while adjusting the predefined geographical position of the first base station between each iteration until the determined differences approaches zero.

5. The method of claim 4, wherein the method of least squares uses the following formula:

$$BS_{x,y} = \operatorname*{argmin}_{x,y} \sum_{all\ measurements} (\text{measured } TOA - \text{expected } TOA(BS_{x,y}))^2,$$

wherein x,y are geographical co-ordinates, TOA is signal transport time value exemplified by Time of Arrival (TOA), and $BS_{x,y}$ is an approximation of the geographical position of the base station.

6. The method of claim 1, further comprising:
   storing the determined actual first base station delay as a new predefined first base station delay.

7. A position calculation node in a wireless communication network, configured for improving accuracy when determining positions in the wireless communication network, the position calculation node comprising a processor and a memory, said memory containing instructions executable by said processor, whereby the position calculation node is operative to:
   obtain a signal transport time value for each of a plurality of different geographical UE positions, wherein the respective signal transport time value relates to the time it takes for a radio signal to travel between a first base station and one of the plurality of UE positions, wherein each of the signal transport time values comprises a time of arrival (TOA) value indicating when a radio signal arrived at a receiving node and a time of sending value indicating when the radio signal was sent from a transmitting node, the receiving node being the first base station and the transmitting node being a UE at one of the plurality of UE positions, or the receiving node being the UE at one of the plurality of UE positions and the transmitting node being the first base station;
   obtain a geographical position value for each of the plurality of different geographical UE positions, the position values being independent of the signal transport time values; and
   determine an actual geographical position for the first base station, based on the obtained signal transport time values, the obtained position values and a predefined geographical position for the first base station.

8. The position calculation node of claim 7, wherein each of the signal transport time values comprises a reference signal time difference (RSTD) value calculated as a difference between a first time of arrival (TOA) value associated with the first base station, and a second TOA value associated with a second base station, and wherein the position calculation node is operative to determine the actual geographical position for the first base station and an actual geographical position for the second base station based on the obtained signal transport time values, the obtained position values, the predefined geographical position for the first base station and a predefined geographical position for the second base station.

9. The position calculation node of claim 7, wherein the position calculation node is operative to determine the actual geographical position for the first base station by:
   determining an expected signal transport time value for each of the UE positions based on the respective obtained UE position values and the predefined geographical position for the first base station,
   determining differences between respective of the expected signal transport time values and respective of the obtained signal transport time values that concerns the same UE position, and
   determining the actual geographical position for the first base station by iteratively performing a method of least squares on the determined differences, while adjusting the predefined geographical position of the first base station between each iteration until the determined differences approaches zero.

10. The position calculation node of claim 9, wherein the method of least squares uses the following formula:

$$BS_{x,y} = \operatorname*{argmin}_{x,y} \sum_{all\ measurements} (\text{measured } TOA - \text{expected } TOA(BS_{x,y}))^2,$$

wherein x,y are geographical co-ordinates, TOA is signal transport time value exemplified by Time of Arrival (TOA), and $BS_{x,y}$ is an approximation of the geographical position of the base station.

11. The position calculation node of claim 7, wherein the position calculation node is further operative to determine an actual first base station delay, based on the obtained signal transport time values, the obtained position values, the predefined geographical position for the first base station and a predefined first base station delay.

12. A method performed by a position calculation node in a wireless communication network for improving accuracy when determining positions in the wireless communication network, the method comprising:
   obtaining a signal transport time value for each of a plurality of different geographical user equipment (UE) positions, wherein the respective signal transport time value relates to the time it takes for a radio signal to travel between a first base station and one of the plurality of UE positions;
   obtaining a geographical position value for each of the plurality of different geographical UE positions, the position values being independent of the signal transport time values;
   determining an actual geographical position for the first base station, based on the obtained signal transport time values, the obtained position values and a predefined geographical position for the first base station; and
   determining an actual first base station delay, based on the obtained signal transport time values, the obtained position values, the predefined geographical position for the first base station and a predefined first base station delay.

* * * * *